G. W. HATCH.
Sleigh Runner.

No. 89,658. Patented May 4, 1869.

Witnesses:
John F. Brooks
E. Greene Collins

Inventor:
G. W. Hatch
Per _____
Attorneys.

United States Patent Office.

G. W. HATCH, OF PARKMAN, OHIO.

Letters Patent No. 89,658, dated May 4, 1869.

IMPROVED SLEIGH-RUNNER.

The Schedule referred to in these Letters Patent and making part of the same.

*To all whom it may concern:*

Be it known that I, G. W. HATCH, of Parkman, in the county of Geauga, and State of Ohio, have invented a new and useful Improvement in Sled-Runners; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish an improved sled or sleigh-runner, which shall be cheaper in construction, stronger, and more durable than the runners constructed in the ordinary manner; and It consists in casting the runner-shoe and knees in one piece, and with grooves, or recesses, to receive wooden strengthening-pieces, as hereinafter more fully described.

A represents the runner;

B, the shoe; and

Figure 1:
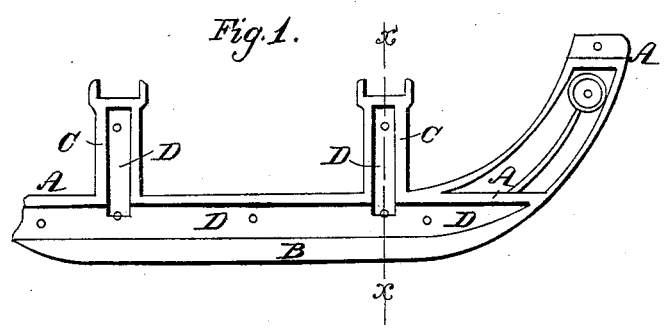
Figure 1 is a side view of one of my improved sled-runners.
Figure 2:
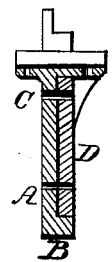
Figure 2 is a vertical section of the same, taken through the line x-x, fig. 1.

C, the knees of the runner, which are cast in one piece, as shown in figs. 1 and 2.

The knees C are formed with recesses in their upper ends, to receive the ends of the beams.

Upon one side of the knees C and runners A are formed grooves, or recesses, to receive the timbers D, which are secured in place by bolts.

The timbers D strengthen the runner, and enable it to be made lighter than is possible when the said runner is made solid.

The timbers D may be further secured in place by allowing the lower ends of the timbers placed in the knees C to enter notches in the timber placed in the body of the runner, as shown in fig. 1, so as to bind the timbers together.

Having thus described my invention,

What I claim as new, and desire to secure by Letters Patent, is—

Casting the runner, shoe, and knees in one piece, and with grooves, or recesses, to receive wooden strengthening-timbers, substantially as herein shown and described, and for the purpose set forth.

The above specification of my invention signed by me, this      day of        , 1869.

G. W. HATCH.

Witnesses:
J. E. HATCH,
G. A. HATCH.